United States Patent [19]

Rubin

[11] Patent Number: 5,021,141

[45] Date of Patent: Jun. 4, 1991

[54] SYNTHESIS OF CRYSTALLINE ZSM-12 TYPE STRUCTURE

[75] Inventor: Mae K. Rubin, Bala Cynwyd, Pa.

[73] Assignee: Mobil Oil Corp., Fairfax, Va.

[21] Appl. No.: 582,070

[22] Filed: Sep. 14, 1990

[51] Int. Cl.$^5$ .................. C10G 1/00; C10G 11/05; C01B 33/34; B01J 21/00

[52] U.S. Cl. .................. 208/46; 423/328; 502/77; 502/64; 208/113; 208/114; 208/119; 208/120

[58] Field of Search ............ 423/305, 306, 277–279, 423/326, 328, 329; 502/61, 64, 77; 208/46, 113, 114, 119, 120

[56] References Cited

U.S. PATENT DOCUMENTS

| | | | |
|---|---|---|---|
| 3,832,449 | 8/1974 | Rosinski et al. | 423/328 |
| 4,112,056 | 9/1978 | Chen et al. | 423/329 |
| 4,151,189 | 4/1979 | Rubin et al. | 260/448 |
| 4,296,083 | 10/1981 | Rollmann | 423/329 |
| 4,391,785 | 7/1983 | Rosinski et al. | 423/328 |
| 4,439,409 | 3/1984 | Puppe et al. | 423/328 |
| 4,452,769 | 6/1984 | Chu et al. | 423/329 |
| 4,482,531 | 11/1984 | Kuehl | 423/329 |
| 4,539,193 | 9/1985 | Valyocsik | 423/328 |
| 4,552,738 | 11/1985 | Rubin | 423/328 |
| 4,552,739 | 11/1985 | Kuhl | 423/329 |
| 4,559,213 | 12/1985 | Kuhl | 423/329 |
| 4,585,637 | 4/1986 | Rubin | 423/328 |
| 4,585,639 | 4/1986 | Szostak | 423/328 |
| 4,585,746 | 4/1986 | Valyocsik | 423/328 |
| 4,636,373 | 1/1987 | Rubin | 423/328 |
| 4,954,325 | 9/1990 | Rubin et al. | 423/328 |

OTHER PUBLICATIONS

U.S. patent application Ser. No. 471,173, filed 1/26/90.

*Primary Examiner*—H. M. S. Sneed
*Assistant Examiner*—R. Bruce Breneman
*Attorney, Agent, or Firm*—Alexander J. McKillop; Charles J. Speciale; Lori F. Cuomo

[57] ABSTRACT

This invention relates to a new form of crystalline material identified as ZSM-12 type, to a new and useful improvement in sunthesizing said crystalline material and to use of said crystalline material prepared in accordance herewith as a catalyst for organic compound e.g. hydrocarbon compound, conversion.

18 Claims, No Drawings

SYNTHESIS OF CRYSTALLINE ZSM-12 TYPE STRUCTURE

BACKGROUND OF THE INVENTION

1. Field of the Invention

This invention relates to a new and useful improvement in synthesizing a crystalline ZSM-12 type structure, the new ZSM-12 synthesized, and to use of the crystalline material synthesized in accordance herewith as a catalyst component for organic compound, e.g. hydrocarbon compound, conversion.

More particularly, this invention relates to an improved method for preparing the crystalline ZSM-12 type structure whereby synthesis is facilitated and reproducible and the product exhibits high purity and catalytic utility.

2. Discussion of the Prior Art

Crystalline silicate ZSM-12 and its conventional preparations are taught by U.S. Pat. Nos. 3,832,449 and 4,552,739, the entire disclosures of which are incorporated herein by reference. It has a distinctive X-ray diffraction pattern which identifies it from other known crystalline materials.

U.S Pat. No. 4,391,785 teaches a method for synthesis of zeolite ZSM-12 from a reaction mixture comprising, as a directing agent, a compound selected from the group consisting of dimethyl pyridinium halide and dimethyl pyrrolidinium halide. U.S. Pat. No. 4,296,083 claims synthesizing zeolites characterized by a Constraint Index of 1 to 12 and an alumina/silica mole ratio of not greater than 0.083 from a specified reaction mixture containing an organic nitrogen-containing cation provided by an amine identified as being selected from the group consisting of triethylamine, trimethylamine, tripropylamine, ethylenediamine, propanediamine, butanediamine, pentanediamine, hexanediamine, methylamine, ethylamine, propylamine, butylamine, dimethylamine, diethylamine, dipropylamine, benzylamine, aniline, pyridine, piperidine and pyrrolidine.

U.S. Pat. No. 4,151,189 claims a method for synthesizing zeolites ZSM-5, ZSM-12, ZSM-35 and ZSM-38 containing an organic nitrogen cation from a specified reaction mixture containing a primary amine having 2 to 9 carbon atoms as a directing agent. U.S. Pat. No. 4,112,056 teaches a synthesis method for ZSM-12 from a reaction mixture containing tetraethylammonium ions as directing agent. U.S. Pat. No. 4,452,769 claims a method for synthesizing ZSM-12 from a reaction mixture containing methyltriethylammonium ions as the directing agent. European Patent Application 13,630 claims synthesis of ZSM-12 from a reaction mixture containing a directing agent defined as an organic compound containing nitrogen and comprising "an alkyl or aryl group having between 1 and 7 carbon atoms, at least one of which comprises an ethyl radical".

Lok et al. (3Zeolites, 282-291 (1983)) teach numerous organic compounds which act as directing agents for synthesis of various crystalline materials, such as, for example, ZSM-5, ZSM-11, ZSM-12, ZSM-20, ZSM-35, ZSM-48, AlPO -5, AlPO$_4$-8, AlPO$_4$-20 and others. The article does not show the presently required organic for synthesis of ZSM-12. The zeolitic compositions labeled "PSH-3" in U.S. Pat. No. 4,439,409 are synthesized from reaction mixtures containing hexamethyleneimine as directing agent. U.S. Pat. No. 4,954,325 utilizes hexamethyleneimine in another reaction mixture to direct synthesis of MCM-22. That organic is used in U.S. Pat. No. 4,981,663 for synthesis of yet another crystalline structure labelled MCM-35.

Other publications teaching various organic directing agents for synthesis of various crystalline materials include, for example, U.S. Pat. No. 4,592,902, teaching use of an alkyltropinium directing agent, alkyl being of 2 to 5 carbon atoms, for synthesis of ZSM-5; U.S. Pat. No. 4,640,829, teaching use of dibenzyldimethylammonium directing agent for synthesis of ZSM-50; U.S. Pat. No. 4,637,923, teaching use of $(CH_3)_2(C_2H_5)N^+(CH_2)_4N^+(C_2H_5)(CH_3)_2$ directing agent for synthesis of another novel zeolite; U.S. Pat. No. 4,585,747, teaching use of bis (N-methylpyridyl) ethylinium directing agent for synthesis of ZSM-48; U.S. Pat. No. 4,585,746, teaching use of bis (N-methylpyridyl) ethylinium directing agent for synthesis of ZSM-12; U.S. Pat. No. 4,584,286, teaching use of bis (N-methylpyridyl) ethylinium directing agent for synthesis of ZSM-35; U.S. Pat. No. 4,568,654, teaching use of cobalticinium, dimethylpiperidinium, trimethylene bis trimethylammonium or tetramethylpiperazinium directing agents for synthesis of ZSM-51; U.S. Pat. No. 4,559,213, teaching use of DABCO-C$_{4-10}$-diquat directing agent for synthesis of ZSM-12; U.S. Pat. No. 4,482,531, teaching synthesis of ZSM-12 with a DABCO-C$_n$-diquat, n being 4,5,6 or 10, directing agent; and U.S. Pat. No. 4,539,193, teaching use of bis (dimethylpiperidinium) trimethylene directing agent for synthesis of ZSM-12.

U.S. Pat. No. 4,139,600 teaches a method for synthesis of zeolite ZSM-5 from a reaction mixture comprising, as a directing agent, an alkyldiamine. U.S. Pat. No. 4,341,748 shows synthesis of ZSM-5 structure from reaction mixtures comprising ethanol, ZSM-5 seeds, ethanol and seeds, ethanol and ammonimum hydroxide, and ethanol, ammonium hydroxide and ZSM-5 seeds. U.S. Pat. No. 4,100,262 teaches synthesis of ZSM-5 from a reaction mixture comprising a tetraalkylammonium source and a tetraureacobalt (II) complex.

Various diquaternary ammonium compounds have been identified as directing agents for a particular assortment of crystalline materials. For instance, U.S. Pat. Nos. 4,490,342 and 4,619,820 show synthesis of ZSM-23 from a reaction mixture containing the organic of U.S. Pat. No. 4,531,012, i.e. $(CH_3)_3N^+(R)N^+(CH_3)_3$, where R is a saturated or unsaturated hydrocarbon having 7 carbon atoms. U.S. Pat. No. 4,623,527 teaches numerous diquaternary ammonium compounds and shows use of $(CH_3)_3N^+(CH_2)_7N^+(CH_3)_3$ directing agent for synthesis of MCM-10.

U.S. Pat. No. 4,632,815 teaches numerous diquaternary ammonium compounds and shows use of $(CH_3)_3N^+(CH_2)_4N^+(CH_3)_3$ to direct synthesis of a Silica-X structure type. U.S. Pat. No. 4,585,639 teaches use of the diquaternary $(C_2H_5)(CH_3)_2N^+(CH_2)_4$ $_{or}$ $_6N^+(CH_3)_2(C_2H_5)$ as directing agent for synthesis of ZSM-12. Synthesis of ZSM-5 is directed by the diquaternary (alkyl)$_3$N$^+$(CH$_2$)$_6$N$^+$(alkyl)$_3$, alkyl being propyl or butyl, in U.S. Pat. No. 4,585,638.

EPA 42,226 and U.S. Pat. No. 4,537,754 teach existence of numerous diquaternary ammonium compounds, but show use of $(CH_3)_3N^+(CH_2)_6N^+(CH_3)_3$ as directing agent for synthesis of EU-1. EPA 51,318 teaches use of the same diquaternary for synthesis of TPZ-3. It is noted that EU-1, TPZ-3 and ZSM-50 have the same structure.

Applicant knows of no prior art method for preparing a crystalline ZSM-12 type structure utilizing the present method.

SUMMARY OF THE INVENTION

An improved, economical and reproducible method for preparing a crystalline structure identified as ZSM-12 type exhibiting high purity, catalytic activity and other valuable properties is provided. The method comprises forming a reaction mixture hydrogel containing sources of alkali or alkaline earth metal (M) cations; an oxide of trivalent element X, e.g. aluminum, boron, iron, gallium, indium and mixtures thereof; an oxide of tetravalent element Y, e.g. silicon, germanium, tin and mixtures thereof; hexamethyleneimine directing agent R; and water, said reaction mixture having a composition in terms of mole ratios, within the following ranges:

| Reactants | Useful | Preferred |
|---|---|---|
| $YO_2/X_2O_3$ | 60 to >2000 | 90 to 1000 |
| $H_2O/YO_2$ | 5 to 200 | 8 to 50 |
| $OH^-/YO_2$ | 0.1 to 0.4 | 0.1 to 0.3 |
| $M/YO_2$ | 0.05 to 1.0 | 0.1 to 0.8 |
| $R/YO_2$ | 0.1 to 1.0 | 0.2 to 0.4 |

The method further comprises maintaining the reaction mixture until crystals of the ZSM-12 type of structure are formed. Reaction conditions required consist of heating the foregoing reaction mixture to a temperature of from about 120° C. to about 210° C. for a period of time of from about 24 hours to about 10 days. A more preferred temperature range is from about 140° C. to about 160° C. with the amount of time at a temperature in such range being from about 50 hours to about 7 days. The solid product comprising ZSM-12 type crystals is recovered from the reaction medium, as by cooling the whole to room temperature, filtering and water washing.

EMBODIMENTS

The particular effectiveness of the presently required organic directing agent, when compared with other directing agents, such as those identified above, for the present synthesis is believed due to its ability to function as a template in the nucleation and growth of ZSM-12 type crystals from the above high $YO_2$, e.g. $SiO_2$, high alkalinity, e.g. high $OH^-/YO_2$, reaction mixture. This is true even though no predigestion of the gel is required prior to crystallization. This different organic directing agent functions in this fashion in the reaction mixture having the above described composition and under the above described conditions of temperature and time.

The crystalline product of the present method has a $YO_2/X_2O_3$, e.g. $SiO_2/Al_2O_3$, molar ratio within a rather broad range of from about 60 to greater than about 2000.

It should be noted that the ratios of components of the reaction mixture required herein are critical to achieve maximum effectiveness. For instance, when the $OH^-/YO_2$ ratio is less than 0.1, formation of ZSM-12 type crystals is diminished in favor of MCM-35 crystals. Further, when the $YO_2/X_2O_3$ ratio is less than about 90, the product contains increasing amounts of impurities such as, for example, mordenite. In general, with higher $YO_2/X_2O_3$ and $OH^-/YO_2$ ratios in the reaction mixture, crystallization of ZSM-12 type crystals proceeds in a timely, efficient manner. With lower $YO_2/X_2O_3$ and $OH^-/YO_2$ ratios, MCM-35 and/or other impurity phases tend to synthesize.

The synthesis of the present invention is facilitated when the reaction mixture comprises seed crystals, such as those having the structure of ZSM-12. The use of at least 0.01%, preferably about 0.10%, and even more preferably about 1% seed crystals (based on total weight) of crystalline material will be useful.

The reaction mixture composition for the synthesis of ZSM-12 type crystals hereby can be prepared utilizing materials which can supply the appropriate oxide. The useful sources of $X_2O_3$, e.g. aluminum oxide, include, as non-limiting examples, any known form of such oxide, e.g. aluminum oxide or hydroxide, organic or inorganic salt or compound, e.g. alumina and aluminates. The useful sources of $YO_2$, e.g. silicon oxide, include, as non-limiting examples, known forms of such oxide, e.g. silicic acid or silicon dioxide, alkoxy- or other compounds of silicon, including silica gel and silica hydrosol.

It will be understood that each oxide component utilized in the reaction mixture for this synthesis can be supplied by one or more essential reactants and they can be mixed together in any order. For example, any oxide can be supplied by an aqueous solution. The reaction mixture can be prepared either batchwise or continuously. Crystal size and crystallization time for the product composition comprising the ZSM-12 type crystals will vary with the exact nature of the reaction mixture employed within the above limitations.

The hexamethyleneimine directing agent has been found to effectively stabilize the developing crystal framework of ZSM-12 type during hydrothermal synthesis using the above high $YO_2$, high alkalinity reaction mixture. It also leads to a ZSM-12 type crystal framework capable of an extremely wide range of $YO_2/X_2O_3$ mole ratios as shown herein.

The ZSM-12 type crystal composition prepared hereby has a characteristic X-ray diffraction pattern, including values substantially as set forth in Table 1, hereinafter.

TABLE 1

| Interplanar d-Spacinq, (A) | Relative Intensity ($I/I_o$) |
|---|---|
| 11.9 ± 0.2 | w-m |
| 10.1 ± 0.2 | w |
| 4.76 ± 0.1 | w |
| 4.29 ± 0.08 | vs |
| 3.98 ± 0.08 | w |
| 3.87 ± 0.07 | s |
| 3.49 ± 0.07 | m |
| 3.38 ± 0.07 | m |
| 3.20 ± 0.06 | w |
| 3.05 ± 0.05 | w |
| 2.54 ± 0.04 | w-m |

These X-ray diffraction data were collected with a Philips diffraction system, equipped with a graphite diffracted beam monochromator and scintillation counter, using copper K-alpha radiation. The diffraction data were recorded by step-scanning at 0.04 degrees of two-theta, where theta is the Bragg angle, and a counting time of 4 seconds for each step. The interplanar spacings, d's, were calculated in Angstrom units (A), and the relative intensities of the lines, $I/I_o$, where $I_o$ is one-hundredth of the intensity of the strongest line, above background, were derived with the use of a profile fitting routine (or second derivative algorithm). The intensities are uncorrected for Lorentz and polarization effects. The relative intensities are given in terms of the symbols vs=very strong (60–100), s=strong (40–60), m=medium (20–40) and w=weak (0–20). It should be understood that diffraction data listed for this sample as single lines may consist of multiple overlapping lines which under certain conditions, such as differences in crystallite sizes or very high experimental resolution or crystallographic changes, may appear as resolved or partially resolved lines. Typically, crystallographic changes can include minor changes in unit cell parameters and/or a change in crystal symmetry, without a change in topology of the structure. These minor effects, including changes in relative intensities, can also occur as a result of differences in cation content, framework composition, nature and degree of pore filling, and thermal and/or hydrothermal history. It is noticed that the ZSM-12 type crystals of this invention exhibit an X-ray diffraction pattern with the d-spacing maxima of ZSM-12, but with slightly different relative intensities.

The crystalline material of ZSM-12 type structure prepared hereby has a composition involving the molar relationship:

$$X_2O_3:(y)YO_2$$

wherein X is a trivalent element, such as aluminum, boron, iron, indium and/or gallium, preferably aluminum; Y is a tetravalent element, such as silicon, tin and/or germanium, preferably silicon; and y is at least about 30, usually from about 60 to greater than about 2000, more usually from about 100 to about 1000. In the as-synthesized form, the material has a formula, on an anhydrous basis and in terms of moles of oxides per y moles of $YO_2$, as follows:

$$(0.05 \text{ to } 4.0)M_2O:(1.0 \text{ to } 50)R_2O:X_2O_3:yYO_2$$

wherein M and R are as defined above. The M and R components are associated with the material as a result of their presence during crystallization, and are easily removed by post-crystallization methods hereinafter more particularly described.

Synthetic ZSM-12 type crystals prepared in accordance herewith can be used either in the as-synthesized form, the hydrogen form or another univalent or multivalent cationic form. It can also be used in intimate combination with a hydrogenating component such as tungsten, vanadium, molybdenum, rhenium, nickel, cobalt, chromium, manganese, or a noble metal such as platinum or palladium where a hydrogenation-dehydrogenation function is to be performed. Such components can be exchanged into the composition, impregnated therein or physically intimately admixed therewith. Such components can be impregnated in or on to the ZSM-12 such as, for example, by, in the case of platinum, treating the material with a platinum metal-containing ion. Suitable platinum compounds for this purpose include chloroplatinic acid, platinous chloride and various compounds containing the platinum amine complex. Combinations of metals and methods for their introduction can also be used.

Synthetic ZSM-12 type crystals, when employed either as an adsorbent or as a catalyst in a hydrocarbon conversion process, should be dehydrated at least partially. This can be done by heating to a temperature in the range of from about 65° C. to about 315° C. in an inert atmosphere, such as air, nitrogen, etc. and at atmospheric or subatmospheric pressures for between 1 and 48 hours. Dehydration can be performed at lower temperature merely by placing the zeolite in a vacuum, but a longer time is required to obtain a particular degree of dehydration. The thermal decomposition product of the newly synthesized ZSM-12 can be prepared by heating same at a temperature of from about 200° C. to about 550° C. for from 1 hour to about 48 hours.

The original cations, e.g. alkali or alkaline earth metal, of the as-synthesized material can be replaced in accordance with techniques well known in the art, at least in part, by ion exchange with other cations. Preferred replacing cations include metal ions, hydrogen ions, hydrogen precursor, e.g. ammonium, ions and mixtures thereof. Particularly preferred cations are those which render the material catalytically active, especially for certain hydrocarbon conversion reactions. These include hydrogen, rare earth metals and metals of Groups IIA, IIIA, IVA, IB, IIB, IIIB, IVB and VIII of the Periodic Table of the Elements, especially gallium, indium and tin.

Typical ion exchange technique wold be to contact the synthetic ZSM-12 type material with a salt of the desired replacing cation or cations. Examples of such salts include the halides, e.g. chlorides, nitrates and sulfates.

Representative ion exchange techniques are disclosed in a wide variety of patents including U.S. Pat. Nos. 3,140,249; 3,10,251; and 3,140,253.

Following contact with the salt solution of the desired replacing cation, the ZSM-12 is then preferably washed with water and dried at a temperature ranging from 65° C. to about 315° C. and thereafter may be calcinedin air or other inert gas at temperatures ranging from about 200° C. to about 550° C. for periods of time ranging from 1 to 48 hours or more to produce a catalytically-active thermal decomposition product thereof.

The crystalline ZSM-12 type material prepared by the instant invention is formed in a wide variety of particle sizes. Generally speaking, the particles can be in the form of a powder, a granule, or a molded product, such as extrudate having particle size sufficient to pass through a 2 mesh (Tyler) screen and be retained on a 400 mesh (Tyler) screen. In cases where the catalyst is molded, such as by extrusion, the crystalline silicate can be extruded before drying or dried or partially dried and then extruded.

In the case of many catalysts, it is desired to incorporate the crystals hereby prepared with another material resistant to the temperatures and other conditions employed in certain organic conversion processes. Such matrix materials include active and inactive materials and synthetic or naturally occurring zeolites as well as inorganic materials such as clays, silica and/or metal oxides, e.g. alumina, titania and/or zirconia. The latter may be either naturally occurring or in the form of gelatinous precipitates, sols or gels including mixtures of silica and metal oxides. Use of a material in conjuction with the ZSM-12, i.e. combined therewith, which is active, may enhance the conversion and/or selectivity of the catalyst in certain organic conversion processes. Inactive materials suitably serve as diluents to control the amount of conversion in a given process so that products can be obtained economically and orderly without employing other means for controlling the rate or reaction. Frequently, crystalline catalytic materials have been incorporated into naturally occurring clays, e.g. bentonite and kaolin. These materials, i.e. clays, oxides, etc., function, in part, as binders for the catalyst. It is desirable to provide a catalyst having good crush strength because in a petroleum refinery the catalyst is often subjected to rough handling, which tends to break the catalyst down into powder-like materials which cause problems in processing.

Naturally occurring clays which can be composited with the hereby synthesized crystalline material include the montmorillonite and kaolin families which include the subbentonites, and the kaolins commonly known as Dixie, McNamee, Georgia and Florida clays, or others in which the main mineral constituent is halloysite, kaolinite, dickite, nacrite or anauxite. Such clays can be used in the raw state as originally mined or initially subjected to calcination, acid treatment or chemical modification.

In addition to the foregoing materials, the present crystals can be composited with a porous matrix material such as silica-alumina, silica-magnesia, silica-zirconia, silica-thoria, silica-beryllia, silica-titania, as well as ternary compositions such as silica-alumina-thoria, silica-alumina-zirconia, silica-alumina-magnesia and silica-magnesia-zirconia. The matrix can be in the form of a cogel. A mixture of these components could also be used.

The relative proportions of finely divided crystalline material and matrix vary widely with the crystalline material content ranging from about 1 to about 90 percent by weight, and more usually in the range of about 2 to about 50 percent by weight of the composite.

In general, organic compounds such as, for example, those selected from the group consisting of hydrocarbons, alcohols and ethers, are converted to conversion products such as, for example, aromatics and lower molecular weight hydrocarbons, over the catalytically active form of the composition of this invention by contact under organic compound conversion conditions including a temperature of from about 100° C. to about 800° C., a pressure of from about 0.1 atmosphere (bar) to about 200 atmospheres, a weight hourly space velocity of from about 0.08 hr$^{-1}$ to about 2000 hr$^{-1}$ and a hydrogen/feedstock organic compound mole ratio of from 0 (no added hydrogen) to about 100.

Such conversion processes include, as a non-limiting example, reducing the pour point of feedstock, e.g. gas oils, with reaction conditions including a temperature of from about 430° C. to about 600° C., and a liquid hourly space velocity of from about 10 hr$^{-1}$ to about 30 hr$^{-1}$.

In order to more fully illustrate the nature of the invention and the manner of practicing same, the following examples are presented. In the examples, whenever adsorption data are set forth for comparison of sorptive capacities for water, cyclohexane and n-hexane, they were determined as follows:

A weighed sample of the calcined adsorbant was contacted with the desired pure adsorbate vapor in an adsorption chamber, evacuated to 1 mm and contacted with 12 mm Hg of water vapor or 20 mm Hg of n-hexane, or cyclohexane vapor, pressures less than the vapor-liquid equilibrium pressure of the respective adsorbate at room temperature. The pressure was kept constant (within about ±0.5 mm) by addition of absorbate vapor controlled by a manostat during the adsorption period, which did not exceed about 8 hours. As adsorbate was adsorbed by the sorbant material, the decrease in pressure caused the manostat to open a valve which admitted more adsorbate vapor to the chamber to restore the above control pressures. Sorption was complete when the pressure change was not sufficient to activate the manostat. The increase in weight was calculated as the adsorption capacity of the sample in g/100 g of calcined adsorbant.

When Alpha Value is examined, it is noted that the Alpha Value is an approximate indication of the catalytic cracking activity of the catalyst compared to a standard catalyst and it gives the relative rate constant (rate of normal hexane conversion per volume of catalyst per unit time). It is based on the activity of silica-alumina cracking catalyst taken as an Alpha of 1 (Rate Constant=0.016 sec$^{-1}$). The Alpha Test is described in U.S. Pat. No. 3,354,078; in the *Journal of Catalysis*, Vol. 4, p. 527 (1965); Vol. 6, p. 278 (1966); and Vol. 61, p. 395 (1980), each incorporated herein by reference as to that description. The experimental conditions of the test used herein include a constant temperature of 538° C. and a variable flow rate as described in detail in the *Journal of Catalysis*, Vol. 61, p. 395.

EXAMPLE 1

A 16.3 gram quantity of hexamethyleneimine (hereinafter R) was added to 93.0 grams Q-Brand sodium silicate (28.8% SiO$_2$, 8.9% Na$_2$O) and 124 grams H$_2$O. To this was added a solution containing 2.7 grams Al$_2$(SO$_4$)$_3$·xH$_2$O, 7.7 grams H$_2$SO$_4$, and 155 grams H$_2$O. The mixture was crystallized in a 600 ml stainless steel stirred reactor (250 rpm) at 150° C. for 7 days. The reaction mixture composition can be summarized as follows:

| | |
|---|---|
| SiO$_2$/Al$_2$O$_3$ = | 98.1 |
| OH$^-$/SiO$_2$ = | 0.19 |
| R/SiO$_2$ = | 0.37 |
| H$_2$O/SiO$_2$ = | 42.0 |
| Na$^+$/SiO$_2$ = | 0.60 |

The crystalline product was filtered, washed with water and dried at 120° C. X-ray analysis proved the product to be 110% crystalline ZSM-12 type material compared to a ZSM-12 X-ray standard.

The chemical composition of the product proved to be:

| | Wt. % |
|---|---|
| N | 1.12 |
| Na | 0.17 |
| Al$_2$O$_3$ | 2.3 |
| SiO$_2$ | 84.4 |
| Ash | 89.8 |
| SiO$_2$/Al$_2$O$_3$ | 62.4 |

The vapor sorption capacities of the product crystalline material after calcination for 16 hours at 538° C. were measured to be:

| | Wt. % |
|---|---|
| Cyclohexane, 40 Torr | 6.1 |
| n-hexane, 40 Torr | 6.5 |
| Water, 12 Torr | 5.1 |

The product of this example had the X-ray spectra shown in Table 2.

TABLE 2

| 2 Theta | d(A) | I/I₀ |
| --- | --- | --- |
| 7.48 | 11.81 | 19 |
| 7.66 | 11.53 | 15 |
| 8.92 | 9.90 | 12 |
| 14.84 | 5.96 | 1 |
| 15.29 | 5.79 | 3 |
| 18.75 | 4.73 | 17 |
| 18.96 | 4.68 | 9 |
| 19.18 | 4.62 | 8 |
| 20.07 | 4.42 | 6 |
| 20.97 | 4.23 | 100 |
| 21.42 | 4.14 | 6 |
| 21.91 | 4.05 | 11 |
| 22.47 | 3.95 | 13 |
| 22.99 | 3.86 | 50 |
| 23.34 | 3.81 | 45 |
| 23.91 | 3.72 | 4 |
| 24.44 | 3.64 | 5 |
| 25.24 | 3.52 | 12 |
| 25.83 | 3.45 | 24 |
| 26.28 | 3.39 | 20 |
| 26.92 | 3.31 | 21 |
| 28.00 | 3.18 | 12 |
| 28.50 | 3.13 | 3 |
| 29.36 | 3.04 | 10 |
| 30.95 | 2.887 | 14 |
| 31.84 | 2.809 | 2 |
| 32.92 | 2.718 | 4 |
| 33.76 | 2.653 | 6 |
| 34.42 | 2.606 | 4 |
| 34.68 | 2.586 | 6 |
| 35.76 | 2.509 | 23 |
| 36.54 | 2.457 | 6 |
| 36.97 | 2.429 | 9 |
| 37.70 | 2.384 | 2 |
| 38.56 | 2.333 | 8 |
| 39.76 | 2.265 | 4 |
| 41.14 | 2.192 | 2 |
| 41.94 | 2.153 | 2 |
| 42.90 | 2.106 | 3 |
| 43.91 | 2.060 | 4 |
| 44.57 | 2.031 | 13 |
| 45.57 | 1.989 | 5 |
| 46.15 | 1.965 | 2 |
| 46.89 | 1.936 | 8 |
| 47.49 | 1.913 | 3 |
| 47.94 | 1.896 | 4 |
| 49.48 | 1.841 | 3 |
| 49.97 | 1.824 | 3 |
| 50.68 | 1.800 | 5 |

EXAMPLE 2

A portion of Example 1 product was calcined in a muffle for 6 hours at 538° C. It was exchanged with 10% NH₄Cl solution at 80° C. for five 1-hour contacts. The resulting material was washed free of chloride and dried. The residual sodium level was measured to be only 0.04%.

The dried material was then calcined for three hours at 538° C. and evaluated in the Alpha Test at 538° C. The Alpha Value of this sample proved to be 210.

EXAMPLE 3

The preparation of Example 1 was repeated. The X-ray analysis of the product proved to be 115% crystalline ZSM-12 type material.

The chemical composition of the product of this example proved to be:

| | Wt. % |
| --- | --- |
| N | 1.12 |
| Na | 0.16 |
| Al₂O₃ | 2.1 |
| SiO₂ | 87.2 |
| Ash | 89.1 |
| SiO₂/Al₂O₃ | 70.6 |

The vapor sorption capacities of the product of this example after calcination for 16 hours at 538° C. were measured to be:

| | Wt. % |
| --- | --- |
| Cyclohexane, 40 Torr | 6.2 |
| n-hexane, 40 Torr | 6.3 |
| Water, 12 Torr | 5.7 |

EXAMPLE 4

The preparation of Example 1 was scaled up to a 2 liter reactor. A 65.2 gram quantity of hexamethyleneimine was added to 372 grams Q-brand and 496 grams H₂O. A solution containing 10.8 grams Al₂(SO₄)₃·xH₂O, 30.8 grams H₂SO₄, and 620 grams H₂O was then added. The mixture was crystallized with stirring (250 rpm) at 150° C. for 7 days. X-ray analysis of the washed, dried product proved it to be 110% crystalline ZSM-12 type material.

The chemical composition of the product of this example proved to be:

| | Wt. % |
| --- | --- |
| N | 1.10 |
| Na | 0.18 |
| Al₂O₃ | 2.1 |
| SiO₂ | 82.4 |
| Ash | 85.3 |
| SiO₂/Al₂O₃ | 70.0 |

The vapor sorption capacities of the product crystalline material after calcination for 16 hours at 538° C. were measured to be:

| | Wt. % |
| --- | --- |
| Cyclohexane, 40 Torr | 5.5 |
| n-hexane, 40 Torr | 6.0 |
| Water, 12 Torr | 5.5 |

EXAMPLE 5

A silica precursor was used as the silica source in this preparation. A 20.5 gram quantity of hexametyleneimine was added with stirring to a slurry of 73.3 grams of ammonium exchanged silica precursor (46% solids), 11.7 grams 50% sodium hydroxide solution and 100 grams H₂O. To this mixture was added a solution of 3.4 grams Al₂(SO₄)·xH₂O and 180 grams H₂O. The mixture which had a composition:

| | |
| --- | --- |
| SiO₂/Al₂O₃ = | 98.2 |
| OH⁻/SiO₂ = | 0.20 |
| R/SiO₂ = | 0.37 |
| H₂O/SiO₂ = | 32.2 |
| Na⁺/SiO₂ = | 0.26 | was crystallized at 143° C. in a stirred (250 rpm) reactor for 6 days.

According to X-ray analysis, the product of this example was 95% crystalline ZSM-12 type material with a trace of unidentified crystalline material.

The chemical composition of the product was measured to be:

|  | Wt. % |
|---|---|
| N | 1.4 |
| Na | 0.17 |
| $Al_2O_3$ | 2.0 |
| $SiO_2$ | 82.4 |
| Ash | 85.3 |
| $SiO_2/Al_2O_3$ | 70.0 |

The vapor sorption capacities of the product crystalline material after calcination for 16 hours at 538° C. proved to be:

|  | Wt. % |
|---|---|
| Cyclohexane, 40 Torr | 9.2 |
| n-hexane, 40 Torr | 10.2 |
| Water, 12 Torr | 6.7 |

EXAMPLE 6

A 28.4 gram quantity of Ultrasil was added to a solution containing 3.4 grams of 50% sodium hydroxide solution and 340 grams $H_2O$. To this mixture was added 15.0 grams hexamethyleneimine and 0.5 grams ZSM-12 seeds. The mixture which had the composition:

| $SiO_2/Al_2O_3 =$ | >1000 |
|---|---|
| $OH^-/SiO_2 =$ | 0.10 |
| $R/SiO_2 =$ | 0.36 |
| $H_2O/SiO_2 =$ | 44.6 |
| $Na^+/SiO_2 =$ | 0.10 | was crystallized with agitation at 150° C. for 6 days.

X-ray analysis proved the product to be 120% crystalline ZSM-12 type material.

The chemical composition of the product was measured to be:

|  | Wt. % |
|---|---|
| N | 0.85 |
| Na | 0.19 |
| $Al_2O_3$ | 0.18 |
| $SiO_2$ | 91.7 |
| Ash | 92.7 |
| $SiO_2/Al_2O_3$ | 852 |

The vapor sorption capacities of the product of this example after calcination for 16 hours at 538° C. proved to be:

|  | Wt. % |
|---|---|
| Cyclohexane, 40 Torr | 8.3 |
| n-hexane, 40 Torr | 6.4 |
| Water, 12 Torr | 1.9 |

EXAMPLE 7

A 16.3 gram quantity of hexamethyleneimine was added to a mixture of 93.0 grams Q-brand and 124 grams $H_2O$. To this was added a solution containing 3.8 grams $Al_2(SO_4)_3 \cdot xH_2O$, 7.2 grams $H_2SO_4$, and 155 grams $H_2O$. The mixture which had the composition:

| $SiO_2/Al_2O_3 =$ | 70.0 |
|---|---|
| $OH^-/SiO_2 =$ | 0.19 |
| $R/SiO_2 =$ | 0.37 |
| $H_2O/SiO_2 =$ | 42.0 |
| $Na^+/SiO_2 =$ | 0.60 | was crystallized with stirring for 7 days at 150° C.

The X-ray analysis proved this product to be ZSM-12 type crystals with an impurity of mordenite.

What is claimed is:

1. A method for synthesizing crystalline material exhibiting a characteristic X-ray diffraction pattern including d-spacing maxima values, in Angstroms, as follows:

| |
|---|
| 11.9 ± 0.2 |
| 10.1 ± 0.2 |
| 4.76 ± 0.1 |
| 4.29 ± 0.08 |
| 3.98 ± 0.08 |
| 3.87 ± 0.07 |
| 3.49 ± 0.07 |
| 3.38 ± 0.07 |
| 3.20 ± 0.06 |
| 3.05 ± 0.05 |
| 2.54 ± 0.04 | which comprises (i) preparing a mixture capable of forming said material, said mixture comprising sources of alkali or alkaline earth metal (M), an oxide of trivalent element (X), an oxide of tetravalent element (Y), water and hexamethyleneimine directing agent (R), and having a composition, in terms of mole ratios, within the following ranges:

| $YO_2/X_2O_3$ | 60 to >2000 |
|---|---|
| $H_2O/YO_2$ | 5 to 200 |
| $OH^-/YO_2$ | 0.1 to 0.4 |
| $M/YO_2$ | 0.05 to 1.0 |
| $R/YO_2$ | 0.1 to 1.0 |

(ii) maintaining said mixture under sufficient conditions until crystals of said material are formed; and (iii) recovering said crystalline material from step (ii), said recovered crystalline material containing said R.

2. The method of claim 1 wherein said mixture has the following composition ranges:

| $YO_2/X_2O_3$ | 90 to 1000 |
|---|---|
| $H_2O/YO_2$ | 8 to 50 |
| $OH^-/YO_2$ | 0.1 to 0.3 |
| $M/YO_2$ | 0.1 to 0.8 |
| $R/YO_2$ | 0.2 to 0.4 |

3. The method of claim 1 wherein said mixture further comprises seed crystals in sufficient amount to enhance synthesis of said crystalline material.

4. The method of claim 3 wherein said seed crystals have the structure of ZSM-12.

5. The method of claim 1 wherein said X is aluminum, boron, iron, gallium, indium or a mixture thereof, and said Y is silicon, germanium, tin or a mixture thereof.

6. The method of claim 1 wherein X comprises aluminum and Y comprises silicon.

7. The method of claim 1 comprising replacing ions of the crystalline material recovered in step (iii), at least in part, by ion exchange with an ion or a mixture of ions selected from the group consisting of hydrogen and hydrogen precursors, rare earth metals and metals from Groups IIA, IIIA, IVA, IB, IIB, IIIB, IVB, VIB and VIII of the Periodic Table of Elements.

8. The method of claim 2 comprising replacing ions of the crystalline material recovered in step (iii), at least in part, by ion exchange with an ion or a mixture of ions selected from the group consisting of hydrogen and hydrogen precursors, rare earth metals and metals from Groups IIA, IIIA, IVA, IB, IIB, IIIB, IVB, VIB and VIII of the Periodic Table of Elements.

9. The method of claim 7 wherein said replacing ion is hydrogen or a hydrogen precursor.

10. The method of claim 8 wherein said replacing ion is hydrogen or a hydrogen precursor.

11. The recovered crystalline material of claim 1.

12. The recovered crystalline material of claim 2.

13. The R-containing product crystalline material of claim 7.

14. The R-containing product crystalline material of claim 8.

15. The R-containing product crystalline material of claim 9.

16. The R-containing product crystalline material of claim 10.

17. A process for effecting catalytic conversion of an organic compound-containing feedstock which comprises contacting said feedstock under catalytic conversion conditions with a catalyst comprising an active form, containing at least in part hexamethyleneimine, of the crystalline material product of claim 1.

18. A process for effecting catalytic conversion of an organic compound-containing feedstock which comprises contacting said feedstock under catalytic conversion conditions with a catalyst comprising an active form, containing at least in part hexamethyleneimine, of the crystalline material product of claim 2.

* * * * *